United States Patent [19]

Tobita et al.

[11] Patent Number: 4,995,266
[45] Date of Patent: Feb. 26, 1991

[54] DIFFERENTIAL PRESSURE TRANSMITTER

[75] Inventors: Tomoyuki Tobita, Katsuta; Yoshimi Yamamoto, Naka, both of Japan

[73] Assignee: Hitachi, Ltd., Tokyo, Japan

[21] Appl. No.: 399,916

[22] Filed: Aug. 29, 1989

[30] Foreign Application Priority Data

Sep. 2, 1988 [JP] Japan .................. 63-218361

[51] Int. Cl.$^5$ .................. G01L 7/08; G01L 9/06; G01L 13/06
[52] U.S. Cl. .................. 73/706; 73/708; 73/721; 338/4
[58] Field of Search .......... 73/706, 708, 720, 721, 73/115; 338/4, 42

[56] References Cited

U.S. PATENT DOCUMENTS

| 4,285,244 | 8/1981 | Green | 73/720 |
|---|---|---|---|
| 4,342,318 | 8/1982 | Yamamoto et al. | 73/721 |
| 4,527,428 | 7/1985 | Shimada et al. | 73/721 |

Primary Examiner—Donald O. Woodiel
Attorney, Agent, or Firm—Antonelli, Terry, Stout & Kraus

[57] ABSTRACT

In a differential pressure transmitter having pressure receiving diaphragms forming recesses, a center diaphragm therebetween so as to define two chambers filled with pressure transmission medium, first communication passages respectively connecting the two chambers to the recesses and second communication passages respectively connecting the two chambers to pressure measuring chambers. The diameters of the first communication passages are less than predetermined values determined by the viscosity and volume modulus of the pressure passages, and the volume of the pressure-measuring chamber. The frequency of characteristic vibration and gain of the pressure-measuring chamber and the second communication passage in one side is respectively and substantially equal to that in the other side. A drastic transient pressure transmitted to sensors in the pressure-receiving recesses is absorbed by the communication passages and is not transmitted to the sensor in the form of a differential pressure.

7 Claims, 3 Drawing Sheets

DIFFERENTIAL PRESSURE TRANSMITTER

BACKGROUND OF THE INVENTION

This invention relates to a differential pressure transmitter and more particularly to a differential pressure transmitter having a suitable structure for preventing damage to differential pressure detecting diaphragms even when a differential pressure to be measured between two front and rear points by orifice plates changes abruptly and substantially.

The structure of a conventional differential pressure transmitter of this kind will be explained. When a differential pressure $\Delta P$ is applied, it is transmitted to the front and reverse of a measuring diaphragm equipped with a pressure sensing element such as a semiconductor pressure sensor and is converted to an electric signal in proportion to $\Delta P$, and its output is sent to an external device.

When the differential pressure $\Delta P$ becomes great, the output of the pressure sensing element also increases. When $\Delta P$ becomes even greater, a pressure receiving diaphragm is seated on a wave-shaped portion of a body. Therefore, when $\Delta P$ becomes somewhat great, it stops at a predetermined value as shown in FIG. 4(a) and the output $\Delta E$ of the pressure sensing element reaches a certain saturation output $\Delta E'$. this mechanism is ordinarily referred to as a "protection mechanism" for preventing damage to a measuring diaphragm even when an excessive differential pressure exceeding a measurement range is applied to the pressure sensing element in the differential pressure transmission passage.

As the prior art reference associated with this field of art, mention can be made of U.S. Pat. No. 4,713,969 and Japanese Patent Laid-Open Nos. 60-237337/1985 and 60-238732/1985.

However, the protection mechanism operation described above occurs when the pressure to be measured is applied statically. In an actual plant, however, there is the case where the pressure changes abruptly or drastically or is applied drastically. Accordingly, the measuring diaphragm equipped with the pressure sensing element must be provided with a protection mechanism which prevents a differential pressure exceeding an allowable range from being applied to the diaphragm even in a case of abrupt or drastic pressure changes or application. For example, if a cut-off valve is operated depending on any conditions of the plant during the measurement of the differential pressure and the measurement flow rate is stopped drastically, a drastic pressure rise (which is an impact pressure generally referred to as "water hammer" and "steam hammer") takes place as represented by $\Delta P$ in FIG. 4(b) in the measurement plant, and this pressure is applied to the differential pressure transmitter and can eventually damage the measuring diaphragm equipped with the pressure sensing element.

As described above, the prior art considered only the over-load protection mechanism when the pressure to be measured changes statically, or slowly but did not take into consideration a means for preventing damage to the measuring diaphragm equipped with the sensing element when the pressure to be measured rises or changes drastically or abruptly. Accordingly, there has been the problem in that the measuring diaphragm of known differential pressure transmitters is damaged by a transient impact pressure.

SUMMARY OF THE INVENTION

In view of the problems with the prior art described above, the present invention provides a differential pressure transmitter which has a structure such that transmission of the pressure can be made gentle or smooth such as $\Delta E_2$ ($\Delta E' \sim \Delta E''$) in FIG. 4(b) even for the transient impact pressure such as the drastic rise or change of the pressure to be measured, prevents damage to the measuring diaphragm of the pressure sensing element and has higher reliability and durability.

In a differential pressure transmitter including a first communication passage system consisting of one chamber, a communication passage to a sensor and a pressure-measuring chamber, and a second communication passage system consisting of one another chamber, another communication passage to the sensor and another pressure-measuring chamber, the present invention sets the diameter of the communication passage to the chamber in each of the first and second communication passage systems to a value at least equal to the constant determined by the viscosity and volume elasticity modulus of a pressure transmission medium, by the shape of the communication passage to the sensor and by the volume of the pressure-measuring chamber, in order to reduce the resistance of each communication passage ranging from the pressure-receiving recess to the chamber connected to the center diaphragm. Therefore, a drastic or abrupt transient pressure is absorbed by the chamber connected to the center diaphragm and is not transmitted to the pressure-measuring chamber.

The present invention employs the construction having the number of inherent vibration and gain of the first communication passage system, which are determined by the shape and volume of each communication passage, are equal to those of the second communication passage system. Accordingly, a transient pressure is not transmitted as a differential pressure to the pressure sensing element and consequently, the breakage of the pressure sensing element can be prevented.

DETAILED DESCRIPTION OF THE PREFERRED EMBODIMENTS

Figure 1:
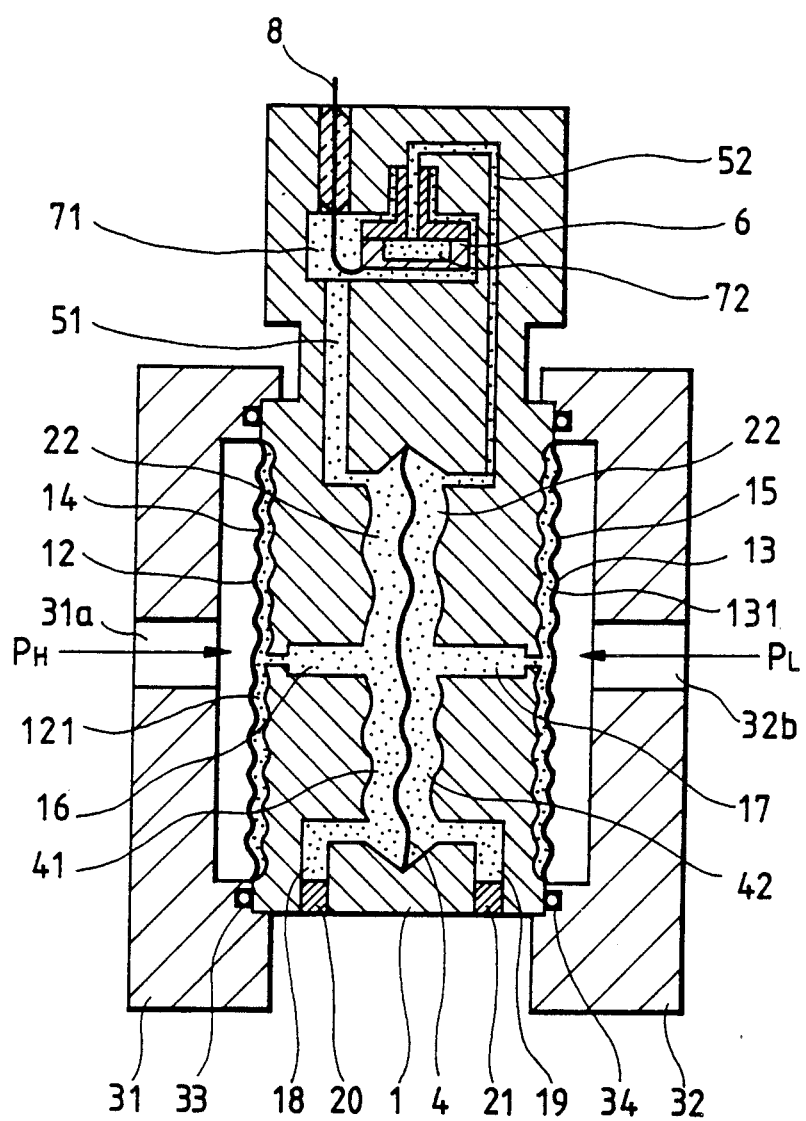
FIG. 1 is a longitudinal sectional view showing a differential pressure transmitter in accordance with one embodiment of the present invention.

In FIG. 1, reference numeral 1 denotes a body whose both side portions have a corrugated shape. Highly flexible high pressure side pressure-receiving diaphragm 12 and low pressure side pressure-receiving diaphragm 13 are fitted in close contact with both side surfaces portions of the body 1 in such a manner as to encompass them. The corrugated shape portions of the body 1 have the same corrugated shape as those of the pressure-receiving diaphragms 12, 13 so that they come into close contact with one another, and high pressure receiving recess 14 and low pressure-receiving recess 15 are defined between the corrugated shape portions and the pressure-receiving diaphragms 12, 13, respectively. The body 1 is provided with a high pressure side communication passage 16 from the high pressure-receiving recess 14 and a low pressure side communication passage 17 from the low pressure-receiving recess 15 and a center diaphragm 4 is interposed between these communication passages 16, 17 in such a manner as to define a high pressure side chamber 41 connected to the center diaphragm 4 and a low pressure side chamber 42 connected to the center diaphragm 4. A high pressure side communication passage 51 and a low pressure side communication passage 52 are respectively connected to both sides of the pressure-sensing element 6 and are formed in the body 1 in order to communicate the two chambers 41, 42 formed to interpose the center diaphragm 4 therebetween with a high pressure side pressure measuring chamber 71 and a low pressure side pressure-measuring chamber 72 partitioned by the measuring diaphragm of the pressure sensing element 6, respectively.

The pressure sensing element 6 consists, for example, of a semiconductor pressure sensor for converting the differential pressure between the measuring chambers 71 and 72 to an electric signal, and its output signal is taken outside through a pin 8 that is sealed hermetically.

A pressure transmission medium 22 such as silicone oil is charged through seal ports 18, 19 into the pressure-measuring recesses 14, 15, the communication passages 16, 17, the chambers 41, 42, the communication passages 51, 52 and the pressure-measuring chambers 71, 72 in the construction described above, and is sealed from external air by seal pins 20, 21.

In the present invention, the shape of the communication passage system, the volume of each chamber 41, 42, 71, 72 and the spring constant of the center diaphragm 4 are selected by selecting the fluid resistance of the communication passage system and the constants of the communication passage systems when forming each chamber 41, 42, each measuring chamber 71, 72 and each communication passage 16, 17, 51, 52, particularly the communication passage 16, 17 and 51, 52, so that even when the drastic change and application (impact pressure) of the pressures to be measured $P_H$, $P_L$ exist, the measuring diaphragm provided with the pressure sensing.

Figure 2:
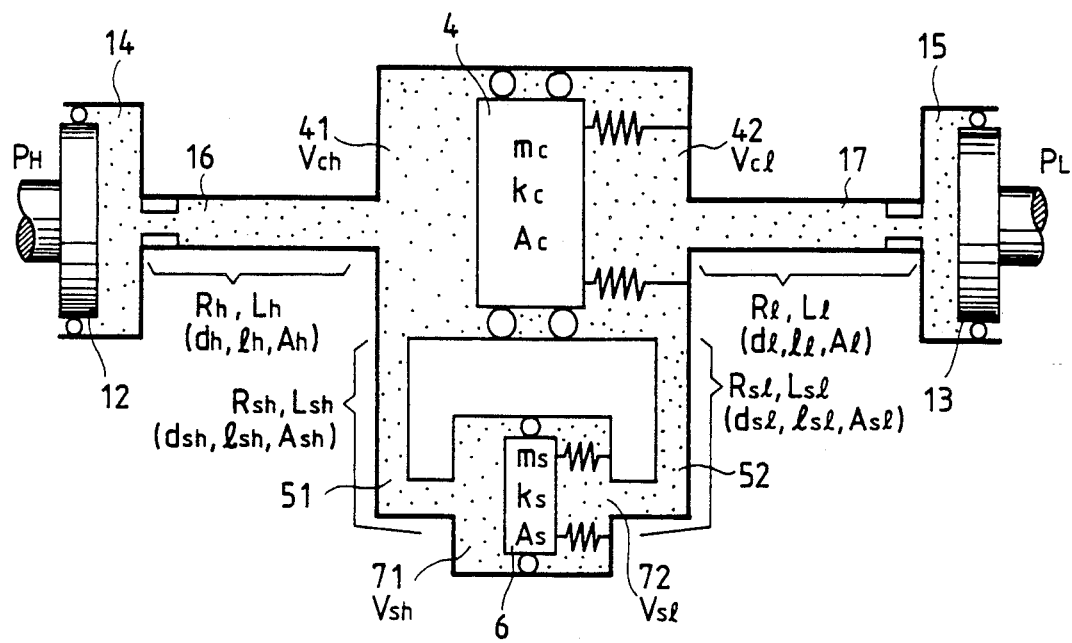
FIG. 2 is a model schematic of the differential pressure transmitter shown in FIG. 1.

When the mechanical system of the differential pressure transmitter shown in FIG. 1 is converted to a fluid spring-mass system model, it can be expressed as a compound system of a fluid spring-mass system such as shown in FIG. 2. Here, the center diaphragm 4 and the measuring diaphragm containing the pressure sensing element 6 are the spring/mass systems consisting of the mass $m_c$, $m_s$ the spring constant $k_c$, $k_s$ and the surface area $A_c$, $A_s$ respectively. The high and low pressure side communication passages 16 and 17 are each formed by the communication passage systems having an inner diameter $d_h$, $d_l$ a length $l_h$, $l_l$ and a sectional area $A_h$, $A_l$ and have a fluid resistance $R_h$, $R_l$ and a fluid inertial resistance $L_h$, $L_l$. The high and low pressure side communication passages 51 and 52 are each formed by a communication passage system having an inner diameter $d_{sh}$, $d_{sl}$ a length $l_{sh}$, $l_{sl}$ and a sectional area $A_{sh}$, $A_{sl}$ and have a fluid resistance $R_{sh}$, $R_{sl}$ and a fluid inertial resistance $L_{sh}$, $L_{sl}$. The high and low pressure side chambers 41 and 42 have a volume $V_{ch}$, $V_{cl}$ and the high and low pressure side measuring chambers 71 and 72 have a volume $V_{sh}$, $V_{sl}$. The density of the pressure transmission medium 22 sealed into them is $\rho$, its volume elastic modulus is K and its viscosity is $\mu$.

In the compound system of the fluid—spring/mass system having such physical constants, an examination of the differential pressure as the difference of pressure occurring between the high and low pressure side measuring chambers 71 and 72 on both sides of the measuring diaphragm having the pressure sensing element 6 when a drastic pressure change (impact pressure) is applied to the high pressure side pressure-receiving diaphragm 12 or to the low pressure side pressure-receiving diaphragm 13 or simultaneously to both the high and low pressure side pressure-receiving diaphragms 12 and 13 is now undertaken.

It will be hereby assumed that the pressure to be measured $P_H$ or $P_L$ is applied step-wise to the pressure-receiving diaphragm 12 or 13. At this time the pressure-receiving diaphragm 12 moves to the low pressure side or to the high pressure side and discharges a predetermined flow rate Q to the communication passage 16. This predetermined flow rate Q is sucked by the chamber 41 and at the same time is discharged into the chamber 42 and further to the communication passage 17. On the other hand, the pressure of the chambers 41 and 42 are determined by the discharge quantity of the flow rate Q described above. These pressure are generally determined by the fluid resistance $R_h$, $R_l$ and the fluid internal resistance $L_h$, $L_l$ of the communication passage 16, 17. If $R_h$, $L_h << R_l$, $L_l$ for example, the period of time in which the pressures of the chambers 41 and 42 exhibit the same value at the initial stage becomes long. The flow rates and pressures occurring in these chamber 41 and 42 are transmitted to the high and low pressure side pressure-measuring chambers 71, 72 through the high and low pressure side communication passages 51, 52, respectively. This transmission is determined by the fluid resistance $R_{sh}$, $R_{sl}$ of each communication passage 51, 52, by the fluid inertial resistance $L_{sh}$, $L_{sl}$ and by the volume $V_{sh}$, $V_{sl}$ of each measuring chamber 71, 72. If $R_{sh}$, $L_{sh} << R_{sl}$, $L_{sl}$ (with the volumes $V_{sh}$, $V_{sl}$ of the measuring chambers 71, 72 being equal to each other) by way of example, the pressure of the chamber 41 is transmitted first through the high pressure side communication passage 51.

Figure 3:
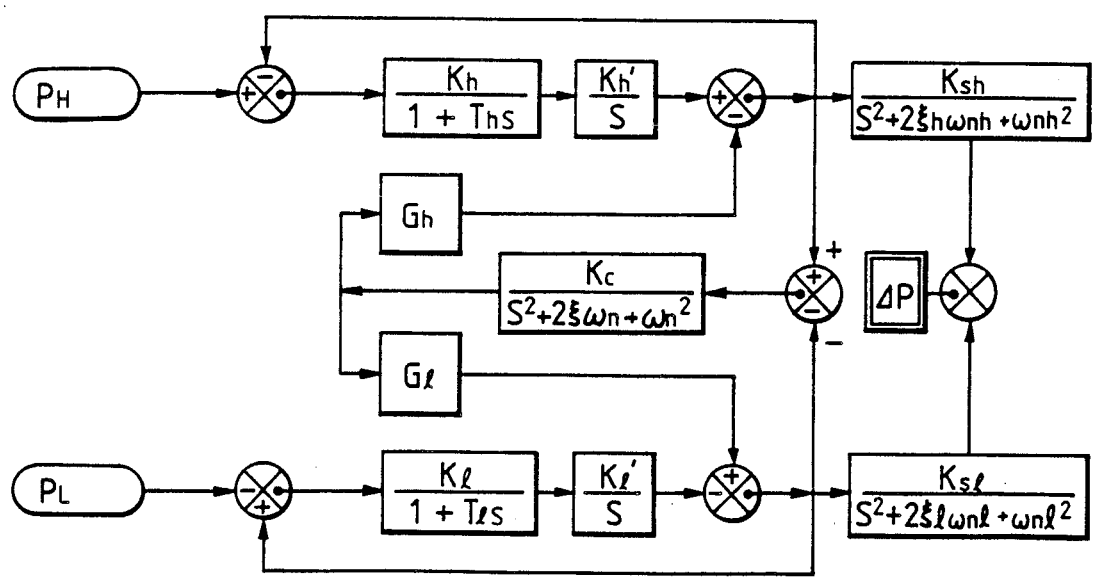
FIG. 3 is a block diagram for determining the response characteristics of FIG. 1.

As described above, since the pressure of each measuring chamber 71, 72 depends on the parameters of all the constituent elements, it cannot be calculated easily. Therefore, it is determined by first determining the transmission function of the input-output relation between each element and by building up the individual transmission functions. When FIG. 2 is converted to the block diagram by such a method, it can be expressed as shown in FIG. 3.

In the preparation of the block diagram shown in FIG. 3, the relationship between the mass, spring constant and surface area of the measuring diaphragm having the pressure sensing element 6 and the center diaphragm 4 is structurally or functionally as follows:

$$m_c >> m_s, \ k_s >> k_c, \ A_c >> A_s$$

Therefore, the measuring diaphragm 6 is considered rigid. Accordingly, the model of FIG. 2 can be expressed by a relatively simple block diagram and can be expressed by two primary delay elements, three secondary delay elements and two integration elements. In FIG. 3, $T_h$ and $T_l$ are time constants of the communication passages 16 and 17, respectively, and $K_h$ and $K_l$ are their gains given by the following formulas:

$$T_h = \frac{dh^2}{32v} \\ T_l = \frac{dl^2}{32} \\ K_h = \frac{\pi dh^4}{128\mu l_h} \\ K = \frac{\pi dl^4}{128\mu l_l}$$ (1)

Where $v$: coefficient of kinematic viscosity. Symbols $K_h'$, $K_l'$, $G_h$, $G_l$, are the gains that are determined by the compression ratio $(1/K)$ of the pressure transmission medium, the volumes $V_{ch}$, $V_{cl}$ and the surface area $A_c$ of the center diaphragm 4 and the given by the following formulas:

$$K_h' = K/V_{ch} \\ K_l' = K/V_{cl} \\ G_h = A_c \cdot K/V_{ch} \\ G_l = A_c \cdot K/V_{cl}$$ (2)

Symbols $\omega_n$ and $K_c$ are respectively the number of inherent vibration and gain of the center diaphragm 4 and are given by the following formulas:

$$\omega_n = \sqrt{K_c/m_c}$$ (3)

$$K_c = A_c/m_c$$

Symbols $K_{sh}$, $\omega_{nh}$, $\xi_{sh}$, $K_{sl}$, $\omega_{nl}$ and $\xi_{sl}$ are the piping arrangement transmission constants that are determined by each communication passage 51, 52 and the volume $V_{sh}$, $V_{sl}$ of each measuring chamber 71, 72 and are given by the following formulas:

$$K_{sh} = K \cdot A_{sh}/\rho \cdot l_{sh} \cdot V_{sh}$$ (4)

$$K_s = K \cdot A_s/\rho \cdot l_{sl} \cdot V_{sl}$$ (5)

$$\omega_{nh} = \sqrt{K \cdot A_{sh}/\mu \cdot l_{sh} \cdot V_{sh}}$$ (6)

$$\omega_n = \sqrt{K \cdot A_s/\rho \cdot l_{sl} \cdot V_{sl}}$$ (7)

$$\xi_h = 16v/d_h^2 \cdot \frac{1}{\omega_{nh}}$$ (8)

$$\xi = 16v/dl^2 \cdot \frac{1}{\omega_{nl}}$$ (9)

Figure 4A:
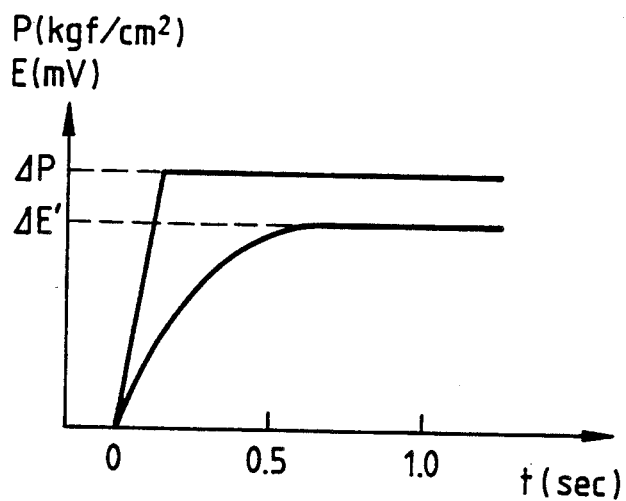
FIG. 4(a) is a graph showing how a protection mechanism keeps the output of a conventional pressure sensing element at a saturation output.
Figure 4B:
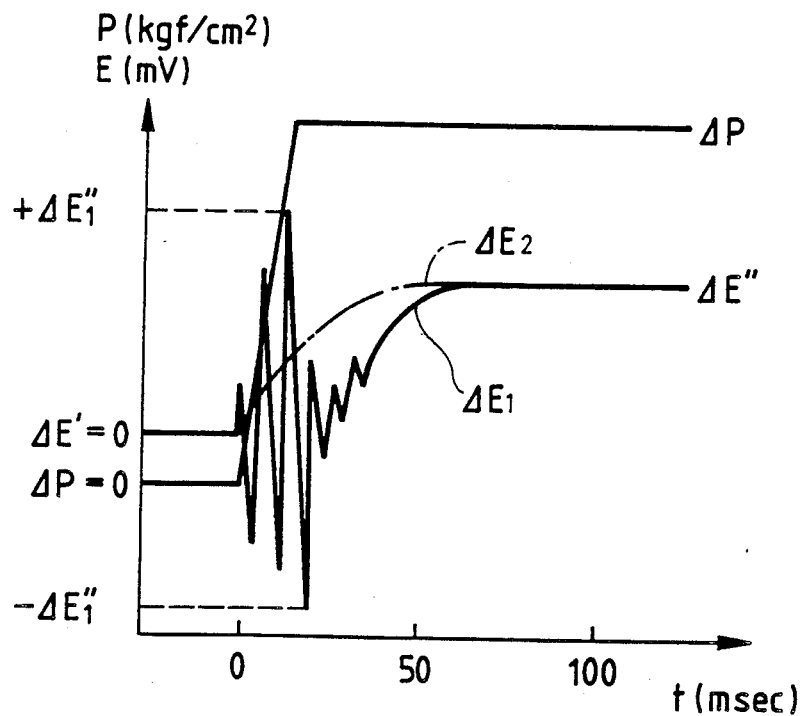
FIG. 4(b) is a graph showing the response of the differential pressure transmitter shown in FIG. 1.

When the pressure $P_H$ or $P_L$ to be measured is applied or changes drastically or when both of these pressures $P_H$, $P_L$ are applied or change drastically in such a block diagram, the present invention examines the condition under which the differential pressure $\Delta P$ between the measuring chambers 71, 72 describes a response waveform not containing a high frequency component such as shown in FIG. 4(b), and the optimum value for each constituent element is determined by changing the physical parameter of each element in the block diagram shown in FIG. 3.

In order to determine the transient characteristics in the model and the block diagram of FIGS. 2 and 3, the pressure transmission of each chamber 41, 42 defined by the center diaphragm 4 is first examined. This pressure transmission is determined by the fluid resistance (R) of each communication passage 16, 17 reaching each high and low pressure side chamber 41, 42, by the field inertial resistance (L) and by the volume. Therefore, the examination is made how to let the pressure transmission medium 22, which flows in from either one of the high and low pressure sides or simultaneously from both of the pressure-receiving recesses 14, 15 on both sides, flow out to the opposite side to the action side as rapidly as possible. The smooth flow of the pressure transmission medium is based on the concept that the rapid and normal operation of the center diaphragm 4 is attained and the occurrence of the excessive pressure in each chamber 41, 42 is prevented.

Therefore, it is first of all desired that in the piping arrangement system formed by each communication passage 16, 17 and each chamber 41, 42, the fluid resistance be as small as possible. Generally, however, there is a limit to the strength of the pressure-receiving diaphragms 12, 13 disposed to overcome a static excessive load, and a fluid resistance of a certain extent must be provided by the shape of each communication passage 16, 17. Therefore, there is a limit to minimization of the fluid resistance described above.

It has been found that the object described above can be accomplished in a practical manner by making the flow of the pressure transmission medium smooth and providing a fluid resistance value which can damp a transient pressure, even when such a pressure occurs in each chamber 41, 42, to the communication passages 51, 52 extending from the chambers 41, 42 to the measuring chambers 71, 72. As this condition, the diameter $d_i$ of the communication passage 16, 17 to the pressure-receiving recess 14, 15 is expressed as the physical constant of each of the pressure transmission medium and the communication passage 51, 52 to the pressure-sensing element 6.

$$\frac{d_i^2}{32} \geq \frac{2}{\sqrt{K \cdot A_{si}/\rho \cdot l_{si} \cdot V_{si}}}$$ (10)

where $i = h, l$ $$\therefore d_i \geq 15 \cdot \sqrt[4]{\left(\frac{\mu}{K}\right) \cdot v \cdot \frac{l_{si} \cdot V_{si}}{d_{si}^2}}$$ (11)

The above explains the construction of the present invention wherein the transient pressure itself cannot be easily transmitted to each measuring chamber. Next, the means of the present invention which prevents the transmission of a pressure difference, even when a transient pressure occurs in each chamber 41, 42, to each measuring chamber 71, 72 as the differential pressure will be explained.

When the transient pressures $P_H'$, $P_L'$ occur in the high and low pressure side chambers 41 and 42, respectively, these pressures $P_H'$, $P_L'$ are transmitted to the high and low pressure side measuring chambers 71 and 72 through the high and low pressure side communication passages 51 and 52, respectively.

As this time, the pressures $P_H''$ and $P_L''$ of the measuring chambers 71 and 72 are expressed as follows from the block diagram of FIG. 3:

$$P_H'' = \frac{K_{sh}}{S^2 + 2\xi_h \cdot \omega_{nh} + \omega_{nh}^2} \cdot P_H' \quad (12)$$

$$P_L'' = \frac{K_{sh}}{S^2 + 2\xi_l \cdot \omega_{nl} + \omega_{nl}^2} \cdot P_L' \quad (13)$$

If the response of the center diaphragm is not high and cannot respond to a drastic pressure change, the pressures of the chambers 41, 42 become $P_H' = P_L'$, and this condition is the worst. Since the transient pressure becomes maximum at this time, a differential pressure $P_H'' - P_L''$ occurs between the measuring chambers 71 and 72. When this differential pressure exceeds the withstand value of the measuring diaphragm having the pressure sensing element 6, the measuring diaphragm could be broken. To prevent the breakage of the measuring diaphragm, therefore, the present invention makes the number of inherent vibration of the diaphragm exactly the same as its gain so that an apparent differential pressure does not occur in the relational formula described above. In other words, in the relational formula described above, the piping arrangement constants (the above-mentioned transmission relation) determined by the shapes and volumes of the chambers 41, 42, communication passages 51, 52 and measuring chambers 71, 72 are made to be the same on the high pressure side and on the low pressure side. More specifically, the number of inherent vibration and gain of each communication passage system may be made equal to each other. This conditional formula can be satisfied when the following formulas (15) and (16) are established:

$$\omega_{nh} = \omega_{nl} \quad (14)$$

$$K_{sh} = K_{sl} \quad (15)$$

These formulas can be rearranged as follows from the relationship of the aforementioned formulas (5) to (10):

$$\frac{V_{sl}}{V_{sh}} = \left(\frac{d_{sl}}{d_{sh}}\right)^2 \cdot \left(\frac{l_{sh}}{l_{sl}}\right) \quad (16)$$

If the shape and volume of each piping arrangement system are determined in such a manner as to satisfy this conditional formula, the pressure occurring in the diaphragm of the pressure sensing element 6 and measuring chambers 71 and 72 do not occur as a differential pressure so that the diaphragm of the pressure sensing element 6 is not broken.

The data of the definite construction of the differential pressure transmitter constructed in accordance with the means of the present invention described above will now be explained. In FIG. 1, the volumes of the high and low pressure side measuring chambers 71 and 72 are mutually different and the shapes (diameter, length) of the communication passages 51 and 52 are different. At this time, the communication passage resistance and constants are set to each communication passage 16, 17 and 51, 52 as described above. It will be assumed that the length of each of the high and low pressure side communication passages 51, 52 and the volume of each of high and low pressure side pressure-measuring chambers 71, 72 are determined and at this time, the diameter of the low pressure side communication passage 52 and the minimum diameters of the communication passages 16, 17 are to be determined.

The inner diameter of the low pressure side communication passage 52 is given as follows when the inner diameter $d_{sh}$ of the high pressure side communication passage 51 is 3 mm, its length $l_{sh}$ is 50 mm, the inner diameter of the low pressure side communication passage 52 is $d_{sl}$, its length $l_{sl}$ is 20 mm, the volume $V_{sh}$ of the high pressure side pressure-measuring chamber 71 is 1 cc, the volume $V_{sl}$ of the low pressure side pressure-measuring chamber 72 is 0.1 cc and the radius of the high and low pressure side communication passages 16, 17 are respectively $d_h$, $d_l$ (where $V_{ch} = V_{cl}$):

$$d_{sl} = (0.1/1) \times 5/2 \times 0.3^2$$
$$= 1.5 \text{ (mm)}$$

The minimum inner diameters of the high and low pressure side communication passages 16, 17 are as follows, respectively:

$$d_h \geqq 15 \times (2.9 \times 10^{-7} \times 0.3/5000) \times 5 \times 1/0.3^2$$
$$d_l \geqq 15 \times (2.9 \times 10^{-7} \times 0.3/5000) \times 2 \times 1/0.15^2$$
$$d_h \geqq 0.8 \text{ (mm)}$$
$$d_l \geqq 0.6 \text{ (mm)}$$

Here, the parameters are as follows:
physical constant of pressure transmission medium
K = 5,000 kgf/cm²
$\nu$ = 0.3 cm²/s
$\mu$ = 2.9 × 10⁻⁷ kgf·s/cm²

If the communication passages can satisfy these shapes, they make it possible to set to the same levels the pressure transmission velocity and amplitude on the high pressure side and on the low pressure side to the measuring diaphragm of the pressure sensing element and can damp the transient pressure to the greatest possible extent. Accordingly, since the transient pressures are applied simultaneously to the high and low pressure sides of the measuring diaphragm, the differential pressure does not act excessively on the measuring diaphragm.

Furthermore, even when the aforementioned drastic pressure (the pressure of the impact wave) is applied to the chambers, the measuring diaphragm is not broken because such a pressure is applied thereto after being damped.

Though this embodiment illustrates a uniform rectangular shape as the shape of the low pressure side communication passage 52, the effect of the invention does not change when it has the same shape (diameter) as that of the high pressure side communication passage 51 or when the low pressure side communication passage 51 is provided with a predetermined constriction based on a theoretical formula. Though the communication passage 52 or 17 on the low pressure side is determined from the communication passage resistance and constant on the high pressure side in this embodiment, the effect of the invention remains completely unaltered even when the communication passage resistance and constant on the high pressure side are determined from the communication passage resistance and constant on the low pressure side on the basis of a theoretical formula.

As described above, in accordance with the present invention, even when a drastic pressure rise or pressure change occurs, its impact pressure can be simultaneously transmitted to both sides of the measuring diaphragm having the pressure sensing element without a phase difference so that an excessive differential pressure is not applied to both surfaces of the measuring diaphragm. Even if such a differential pressure is applied, it is sufficiently damped and the diaphragm is not broken by it. In consequence, durability of the differential pressure transmitter is improved. Furthermore, even at the time of measurement when a synchronous pressure fluctuation exists on the high and low pressure sides, its pulsating differential pressure can be simultaneously transmitted without the phase difference so that any error does not occur in the differential pressure measurement and measuring accuracy of the differential pressure transmitter can be improved.

What is claimed is:

1. A differential pressure transmitter, comprising:
   a body;
   pressure-receiving diaphragms disposed on both sides of the body, and the periphery of the diaphragms being fixed to the body forming recesses filed with a pressure transmission medium;
   a diaphragm disposed between the pressure-receiving diaphragms forming chambers filed with the pressure transmission medium into the body;
   two first communication passages for communicating the chambers with the respective recesses;
   two second communication passages for transmitting the pressure of the chambers; and
   a differential pressure sensor with pressure-measuring chambers for receiving the pressures transmitted by the two second communication passages, and converting a differential pressure of the pressures transmitted from the two second communication passages into an electrical signal, wherein the diameter D of the first communication passage is $$\sqrt{\frac{\left(\frac{\text{(viscosity of the medium)}}{\begin{pmatrix}\text{volume elasticity}\\\text{modulus of the medium}\end{pmatrix}}\right) \times \begin{pmatrix}\text{kinematic coefficient of}\\\text{viscosity of the medium}\end{pmatrix} \times \begin{pmatrix}\text{length of each second}\\\text{communication passage}\end{pmatrix} \times \begin{pmatrix}\text{volume of each pressure}\\\text{measuring chamber}\end{pmatrix}}{\begin{pmatrix}\text{diameter of each second}\\\text{communication passage to recess}\end{pmatrix}^2}}$$

2. The differential pressure transmitter according to claim 1; wherein each of the pressure-measuring chambers and the second communication passages have a shape and volume such that a frequency of characteristic vibration and gain of one of the pressure-measuring chambers and the second communication passages are substantially equal to a frequency of characteristic vibration and gain of the other of the pressure-measuring chambers and the second communication passages.

3. The differential pressure transmitter according to claim 1, wherein each of the pressure-measuring chambers and the second communication passages have a shape and volume such that a frequency of characteristic vibration and gain of one of the pressure-measuring chambers, the second communication passages and the chambers are substantially equal to a frequency of characteristic vibration and gain of the pressure-measuring chambers, the second communication passages and the chambers.

4. A differential pressure transmitter, comprising:
   a body;
   pressure-receiving diaphragms on sides of the body, and the periphery of the diaphragm being fixed to the body forming recesses filled with a pressure transmission medium;
   a diaphragm disposed between the pressure-receiving diaphragms forming chambers filled with the pressure transmission medium into the body;
   two first communication passages for communicating the chambers with the recesses, respectively;
   two second communication passages for transmitting the pressures of the chambers; and
   differential pressure sensing means with pressure-measuring means with pressuring chambers for receiving the pressures transmitted by the two second communication passages, and converting a differential pressure of the pressures transmitted from the two second communication passages into an electric signal; wherein each of the pressure-measuring chambers and the second communication passages have a shape and volume such that a frequency of characteristic vibration and gain of one of the pressure-measuring chambers and the second communication passages are substantially equal to a frequency of characteristic vibration and gain of the other of the pressure-measuring chambers and the second communication passages.

5. The differential pressure transmitter according to claim 4, wherein the diameter D of each of the first communication passages is $$\sqrt{\frac{\left(\frac{\text{(viscosity of the medium)}}{\begin{pmatrix}\text{volume elasticity}\\\text{modulus of the medium}\end{pmatrix}}\right) \times \begin{pmatrix}\text{kinematic coefficient of}\\\text{viscosity of the medium}\end{pmatrix} \times \begin{pmatrix}\text{length of each second}\\\text{communication passage}\end{pmatrix} \times \begin{pmatrix}\text{volume of each pressure}\\\text{measuring chamber}\end{pmatrix}}{\begin{pmatrix}\text{diameter of each second}\\\text{communication passage to recess}\end{pmatrix}^2}}$$

6. A differential pressure transmitter, comprising:
   a body;
   pressure-receiving diaphragms on sides of the body, and the periphery of the diaphragms being fixed forming recesses filled with a pressure transmission medium;
   a diaphragm between the pressure-receiving diaphragms forming chambers filled with the pressure transmission medium into the body;
   two first communication passages for communicating the chambers with the recesses, respectively;
   two second communication passages for transmitting the pressures of the chambers; and
   a differential pressure sensing element with pressure-measuring chambers for receiving the pressures transmitted by the two second communication passages, and converting a differential pressure of the pressures into an electric signal; wherein each of the pressure-measuring chambers, the second communication passages and the chambers have a shape and volume such that a frequency of characteristic vibration and gain of one of the pressure-measuring chambers, the second communication passages and the chambers are equal to a frequency of characteristic vibration and gain of the other of the pressure-measuring chambers, the second communication passages and the chambers.

7. The differential pressure transmitter according to claim 6, wherein the diameter D of each of the first communication passages is $$\sqrt{\frac{(\text{viscosity of the medium}) \times \begin{pmatrix} \text{kinematic coefficient of} \\ \text{viscosity of the medium} \end{pmatrix} \times \begin{pmatrix} \text{length of each second} \\ \text{communication passage} \end{pmatrix} \times \begin{pmatrix} \text{volume of each pressure} \\ \text{measuring chamber} \end{pmatrix}}{\begin{pmatrix} \text{volume elasticity} \\ \text{modulus of the medium} \end{pmatrix} \begin{pmatrix} \text{diameter of each second} \\ \text{communication passage to recess} \end{pmatrix}^2}}$$

* * * * *